No. 714,852. Patented Dec. 2, 1902.
H. AUSTIN.
BALL BEARING.
(Application filed Apr. 23, 1902.)
(No Model.)

UNITED STATES PATENT OFFICE.

HERBERT AUSTIN, OF ERDINGTON, NEAR BIRMINGHAM, ENGLAND.

BALL-BEARING.

SPECIFICATION forming part of Letters Patent No. 714,852, dated December 2, 1902.

Application filed April 23, 1902. Serial No. 104,413. (No model.)

*To all whom it may concern:*

Be it known that I, HERBERT AUSTIN, engineer, a subject of the King of Great Britain, residing at Erdington, near Birmingham, England, have invented certain new and useful Improvements in Ball-Bearings, of which the following is a specification.

This invention relates to that type of ball-bearings wherein a plurality of rings of balls are employed, the balls of one ring being separated from those of the adjacent ring by a washer; and one of the objects of the invention is to provide against the balls falling out when the wheel or like exterior part is removed from the spindle-shaft, axle-arm, or like interior part which carries it and yet permit the rings of balls to take the end thrust consequent upon the movement of one of said major parts relatively to the other in a direction perpendicular to the plane of rotation.

The above objects are accomplished according to this invention in the manner I will now proceed to describe with reference to the accompanying drawings, of which—

Figure 1:
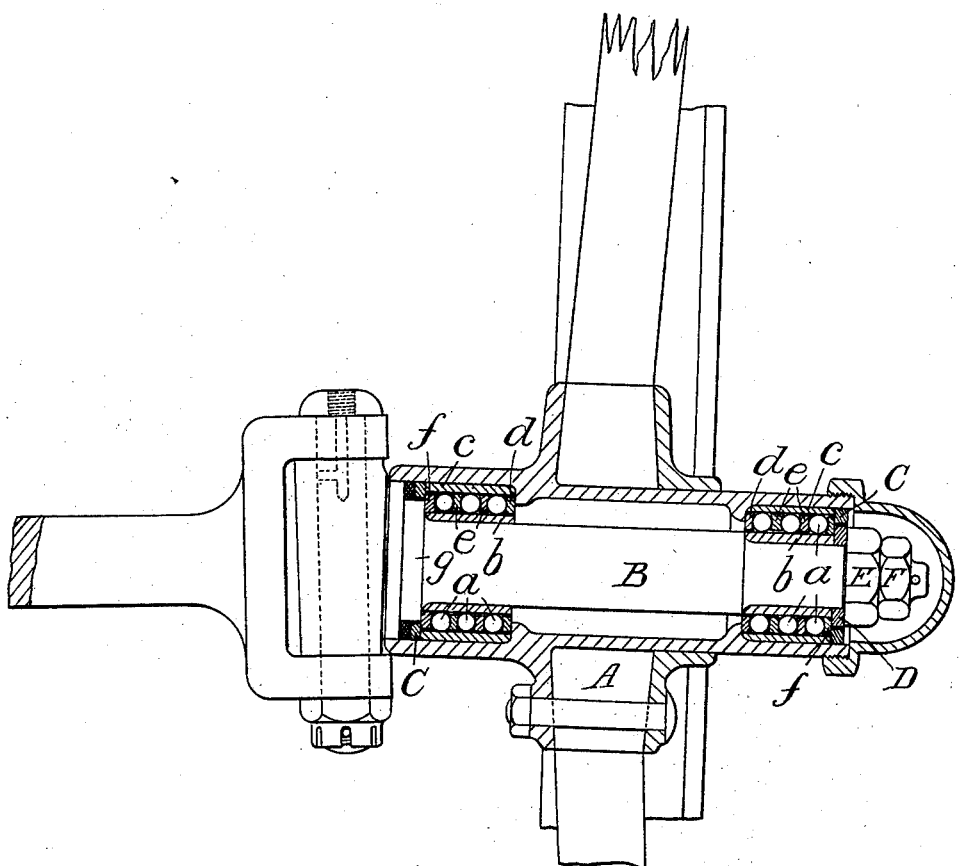
Figure 2:
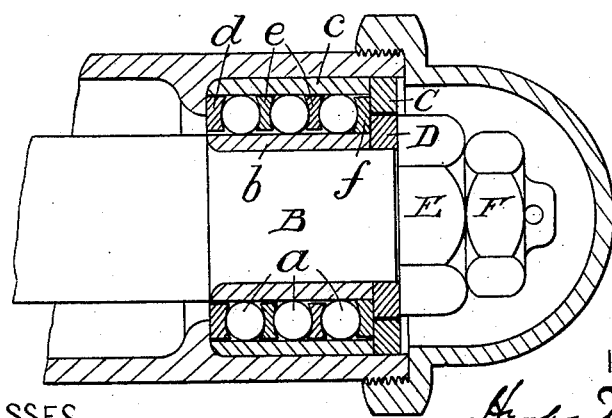

Figure 1 is a longitudinal section through the hub of a motor-car road-wheel, showing the axle in side elevation; and Fig. 2 is an enlarged corresponding section of the outer end of such hub and side elevation of the axle.

The axle shown in Fig. 1 is one of the steering-axles, which is hinged, as is usual, to the outer end of a fixed axle, but is given simply as an example and not as limiting the invention.

A is the hub, and B the axle. Three rings of balls $a$ are shown to be placed between a hard-steel ferrule $b$, fixed on the axle B at each end thereof, and a hard-steel liner $c$, let into the hub A at each end thereof, as is usual. The innermost ring of balls at each end of the hub butts against a hard-steel washer $d$, and between each ring of balls is a hard-steel washer $e$, and against each outer ring of balls is placed a hard-steel washer $f$, all as is usual; but to prevent the balls from falling out when the wheel is removed from the axle each face of a washer which is applied to a ring of balls—that is to say, the inner faces of the washers $d$ and $f$ and both faces of the washers $e$—is brought, as seen in transverse section, somewhat around the halves of the balls which are toward the axis of the bearing, so that the width between the inner edges of any two adjacent washers is less than the diameter of the balls, or, in other words, the ring-like washers have their inner margins slightly thickened, so as to take under the balls and form retainers to prevent the balls from falling into the hollow of the bearing when the axle or axle-arm B is withdrawn. The washers and balls are permanently held in place endwise of the bearing by a washer or nut C, which is forced or screwed up into each end of the hub, as is usual, and abuts against the end of the corresponding liner $c$, and thus when the hub is removed from the axle the balls cannot fall out from between the washers. The hub is securely held in place upon the axle by means of a washer D around the outer end of the axle, which is tightened up against the end of the corresponding ferrule $b$ by means of lock-nuts E F, as is usual, or in any convenient manner. The washers $d$ and $e$ should have clearance between themselves and the ferrules $b$ and are preferably quite loose also within the liners $c$. The washers $f$ should have clearance between themselves and the interiors of the liners $c$ and are preferably just an easy fit around the ferrules $b$.

$g$ is the usual collar on the axle at the inner end of the bearing.

If the wheel should have a tendency to move in an outward direction upon the axle, the outward thrust will be transmitted through the rings of balls in the outer end of the hub to the outer washer $f$ and through this washer to the washer D, which forms the abutment for the thrust, and should the wheel have a tendency to move in the opposite direction upon the axle the inward thrust will be transmitted through the rings of balls in the inner end of the hub to the other or inner washer $f$ and through this washer to the collar $g$, which forms the abutment for this thrust. It will be obvious that whenever a washer $f$ is pressed against the washer D or collar $g$ the corresponding washer or nut C cannot be pressing against the back of the washer $f$ and that therefore though the washer $f$ is held from turning by its frictional hold against the washer D or collar $g$ there is no friction between it and the washer or nut C. This nut forms the fixed outer abutment of the hub A (or exterior major part) and the washer D forms the outer abutment of the axle, (or interior major part.) These abutments are situtated or radially disposed one within the other, as herein shown, and both thus adapted to bear on the outer face of the outer ball-washer $f$.

The hub may be regarded as a fixed bearing and the axle B as a revolving shaft or spindle, in which case the invention is equally applicable, as will be obvious; but the invention is obviously capable of considerable modification in detail.

Having fully described my invention, what I claim, and desire to secure by Letters Patent, is—

1. In a ball-bearing, the combination with the hub and axle, the former provided with an outer hub-abutment and the latter provided with an outer axle-abutment, of a plurality of rings of balls between the inner bearing-surface of the hub and the outer bearing-surface of the axle, loose washers between adjacent rings of balls, each of said washers being thickened at its inner margin to prevent the balls from falling out, and an outer ball-washer embraced between the outer ring of balls and the inner faces of the said outer hub-abutment and outer axle-abutment, the said abutments being disposed, radially, one within the other so that the outer ball-washer may bear at its back against either of said abutments, substantially as set forth.

2. In a ball-bearing of the type in which a plurality of rings of balls are employed, said rings being separated by washers, the combination with the two major parts between which the balls are radially embraced, of the rings of balls, the movable, ball retaining and separating washers, the outer and inner ball-washers, the outer abutment on the exterior major part, and the outer abutment on the interior major part, the last-named abutment being radially within the other and both adapted to bear on the outer ball-washer, substantially as set forth.

In witness whereof I have hereunto signed my name this 8th day of April, 1902, in the presence of two subscribing witnesses.

HERBERT AUSTIN.

Witnesses:
ROBERT G. GROVES,
THOMAS EDWIN CARLESS.